Jan. 5, 1960     L. SCHART     2,919,950

AUTOMATICALLY RELEASABLE COUPLINGS

Original Filed Aug. 20, 1957

INVENTOR
Ludwig Schart

BY
ATTORNEYS

United States Patent Office 2,919,950
Patented Jan. 5, 1960

2,919,950

AUTOMATICALLY RELEASABLE COUPLINGS

Ludwig Schart, Traunreut, Upper Bavaria, Germany

Original application August 20, 1957, Serial No. 679,232. Divided and this application July 28, 1958, Serial No. 751,263

3 Claims. (Cl. 294—83)

This invention relates to improvements in automatically releasable couplings to separate an airborne load from a parachute canopy. The load may consist of any type of cargo, or aircraft wherein the canopy is used to brake the speed of the aircraft; the release operation of the coupling taking place when the landing speed of the aircraft has decelerated to a predetermined degree, or when the cargo makes contact with the ground.

The invention of this application is a division out of U.S. application Serial No. 679,232 filed August 20, 1957.

Automatically releasable parachute canopy couplings for use in connection with dropping of cargo, and braking the landing speed of aircraft are well known, including load connectable frames or parts and canopy connectable parts and detent means to hold such parts together, including springs and other associated features. In some couplings springs are used, the strength of which is calculated by the force of the load pull. Mechanisms for unsafetying coupling parts are a feature of known couplings, but generally in such types of couplings strength of the spring must at least equal or be greater than the weight of the load shock only when the canopy has been inflated and stabilized so as to prevent premature release of the parts of the coupling, such as during the deployment of the canopy after initial discharge of the load. Where the load or pull, such as in dropping of heavy cargo and fast landing speeds of the aircraft, is considerable, it is virtually impossible to furnish springs strong enough to prevent premature release of the coupling parts. It is therefore a purpose of the present invention to provide a coupling for cargo dropping canopies and aircraft braking canopies which fulfills the requirements for a high load pull upon safetying the same and yet permit cheap and weight saving construction. To that end, the invention includes blocking elements under which predetermined load pull will unsafety the coupling only after a proper degree of inflation of the canopy.

A further object of this invention is the provision of an automatically releasable parachute canopy coupling for use in connection with the dropping of cargo loads and the braking of airplanes which includes relatively connectable and releasable canopy attached and load attached parts having associated therewith a blocking means which will place said parts in condition for relative release, and which blocking means is operated to enable such relative release of said parts only when the blocking means is subjected to a sufficient shock force by a properly airborne or inflated canopy to which the coupling is attached.

Other objects and advantages of this invention will be apparent during the course of the following detailed description.

In the accompanying drawings, forming a part of this specification and wherein similar reference characters designate corresponding parts throughout the several views.

Figure 1:
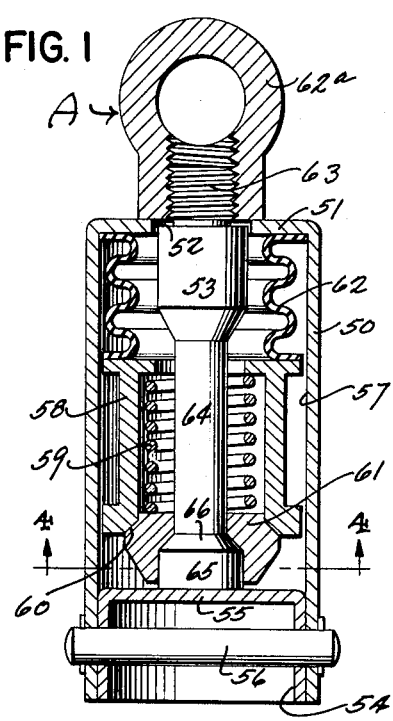
Figure 1 shows a vertical cross sectional view of a canopy attached part and load attached part in connected relation, safetyed by a novel blocking means.

In the drawing, wherein for the purpose of illustration is shown one form of the invention, the letter A may generally designate the same as shown in Figures 1 to 4 of the drawings.

Referring to the form of invention A shown in Figures 1 to 4, inclusive, the load connecting parts are safetyed by means of a corrugated tube of the Sylphon-bellows type, and the releasable detent means consists of a segmentally divided ring, the parts of which are separable. To that end, I have provided a supporting frame which is in the shape of a cylindrical shaped casing structure 50 having a top wall 51 with an opening 52 therethrough adapted to receive an end of the canopy connectable part 53. In the lower end of the casing 50 is provided an inverted cup-shaped insert 54, having a top wall 55. A transverse load connectable shaft or bolt 56 is releasably connected diametrically through the lower part of the frame 50 and the insert 54, as shown in Figure 1, in order to receive a cable connection 57$^a$ for a load.

Within the chamber 57 of the casing 50 is a sleeve or cylindrical member 58 adapted to receive a compression spring 59 therein. The cylinder 58 at its lower end is provided with a downwardly divergently flaring tapered seat 60 adapted to receive the segments 61$^a$ of the detent ring 61 thereagainst. A corrugated collapsible tube 62 of the Sylphon-bellows type rests at one end against the under side of the wall 51 and at its lower end upon the top wall of the cylinder 58. If desired, the end of tube 62 may be permanently connected to the cylinder. Normal expanded position of the tube 62 is shown in Figure 1. In this position it holds the cylinder 58 in the position shown in Figure 1 so that the segments of the ring 61 are not collapsed under the force of spring 59. The canopy connectable bolt or member 53 is provided with a shroud line connecting head 62$^a$ which may be detachably screw threaded at 63 to the upper end of the bolt 53. The bolt 53 has a reduced intermediate shank portion 64. Its lower end is provided with an enlarged head 65 having a neck in the shape of an upwardly convergently flaring ring seat 66.

The segmental blocks or members 61$^a$ of ring 61 are grouped around the bolt neck 66 when the parts are in load supporting position, and the head 65 seats upon the wall 55.

Figure 2:
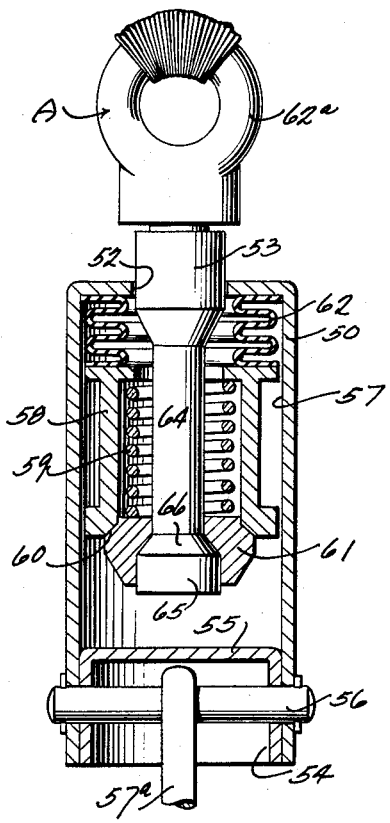
Figure 2 is a vertical cross sectional view of the coupling parts shown in Figure 1 unsafetyed, but with the coupling parts of the coupling still in connected relation.
Figure 3:
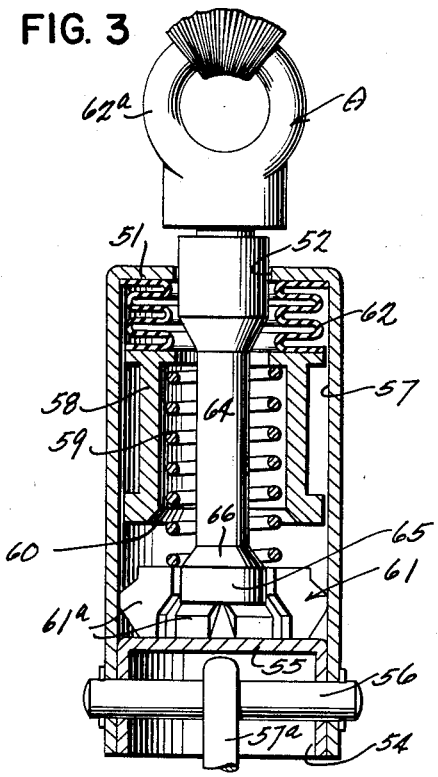
Figure 3 is a vertical cross sectional view of the parts of the form of coupling shown in Figures 1 and 2, showing the canopy connecting part in readiness to detach itself from the load connecting part of the coupling, due to load decrease, such as occurs when ground contact is made by the cargo or incidental to slowing up of landing speed of an aircraft.
Figure 4:
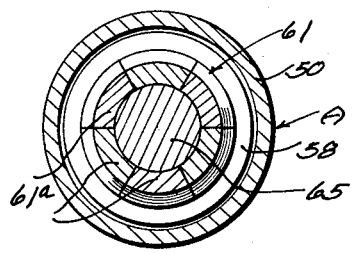
Figure 4 is a transverse cross sectional view taken substantially on the line 4—4 of Figure 1.

In launching position, and on safety, the canopy bolt is positioned as shown in Figure 1. The corrugated tube 62 is deformable to the position shown in Figure 2 when the load is airborne; the cylinder 58 sliding upwardly so its lower end is spaced from the wall 55 as shown in Figure 2. When the proper load reduction occurs, as when the cargo hits the ground, the spring 59 will force the segments 61$^a$ downwardly off of head 65, permitting the bolt 53 to be released from its connection with the casing or frame structure 50 (see Figure 3).

In assembling the load connection pin 56 is removed, as is also the cap 54. The cylinder 58, together with the Sylphon-bellows are first inserted in the relation shown into the chamber 57 and the spring 59 is also inserted into the cylinder 58. The bolt 53, without its ring piece 62, is then pushed in from below with the collar pieces 61ª assembled upon its head 65 held assembled as by a split ring or rubber band or some like expedient. Inasmuch as the segmental pieces 61ª then rest against seat 60, the bolt 53 may then receive its ring piece 62, which is screwed into position for compressing spring 59. The cap 54 is then inserted and the cross bolt 56 then assembled.

Various changes may be made to the form of invention herein shown and described without departing from the spirit of the invention or scope of the claims.

I claim:

1. In an automatically releasable parachute canopy coupling for supporting cargo and other loads, the combination of a casing having means at the bottom of the casing for attaching a load thereto, an elongated rigid bolt like member slidably disposed for movement within the casing, said member having a canopy connectable end extending from the casing, means to limit downward movement of the member with respect to the casing, said bolt like member having an upwardly facing shoulder disposed within the casing, a segmentally divided split detent ring assembly engaging said shoulder and surrounding the lower part of the bolt like member adjacent said shoulder, a cylinder slidably mounted within the casing and having a lower end resting in releasable engagement against the segments of the divided ring and holding said ring in engagement with said shoulder, collapsible means in the casing engaging the cylinder and normally holding the cylinder downwardly in member retaining engagement with the segments of said divided ring, and spring means under compression in the cylinder normally engaging said segments of the divided ring and biased to force them off of said shoulder after the cylinder is moved upwardly in the casing as a result of the load becoming airborne and when the load supported by the bolt like member has landed to enable said spring means to exert its ring segment releasing force.

2. In an automatically releasable parachute canopy coupling for supporting cargo and other loads, the combination of an elongated tubular casing having a chamber therein, means at the bottom of the casing for supporting a load, the casing having a top wall provided with an opening therein, an elongated canopy connectable member movably extending through said opening and having an outer end portion for attachment to a canopy and having a lower end portion within the casing chamber provided with an upwardly facing downwardly divergent tapered shoulder, means on the casing to limit downward movement of the member with respect to the casing, a segmentally divided ring releasably seated upon said shoulder, a sleeve shaped member slidably disposed within said chamber having a lower end engaging the segments of said ring shaped to hold them assembled upon said shoulder, yieldably collapsible and extensible means between the top wall of said casing and the top of said sleeve normally holding the sleeve downwardly so that the sleeve will hold the segments of said ring against said shoulder, and compressed spring means within said sleeve engaging the tops of the segments of said ring and biased to force said segments downwardly off of said shoulder, after the sleeve is moved upwardly in the tube as a result of the load becoming airborne and when a load supported by said coupling has landed to enable said spring to exert its ring releasing force.

3. A coupling as defined in claim 2 in which the extensible means between the top wall of the tube and the sleeve comprises a normally expanded Sylphon-bellows.

No references cited.